United States Patent Office 3,061,578
Patented Oct. 30, 1962

3,061,578
METHOD OF PREPARING SILICONE RUBBER STOCKS COMPRISING MILLING AT A TEMPERATURE ABOVE 60° C. IN THE PRESENCE OF VULCANIZING AGENT
Siegfried Nitzsche and Manfred Wick, Burghausen, Upper Bavaria, Germany, assignors to Wacker-Chemie G.m.b.H., Munich, Bavaria, Germany
No Drawing. Filed Oct. 26, 1959, Ser. No. 848,557
Claims priority, application Germany Nov. 21, 1958
3 Claims. (Cl. 260—41)

This invention relates to a novel method of preparing silicone rubber stocks.

Silicone elastomers form a family of well-known, widely used commercial products. The silicone rubber stocks comprise an organosiloxane polymer, a filler, and a vulcanizing agent with pigments, plasticizers and other additives being optional. The silicone rubber stocks can be vulcanized to elastomeric products by several known methods but the method of vulcanization in widest use employs organic peroxides as vulcanizing agents.

The fillers for silicone rubber stocks can be nonreinforcing fillers such as cork dust, glass frit and silicas exhibiting relatively small surface area per unit volume. When nonreinforcing fillers are employed, the silicone rubber has poor physical properties including low tensile strength and unsatisfactory elongation and recovery. The use of reinforcing fillers has become the accepted practice in the silicone rubber art. When the active or reinforcing fillers are employed in silicone rubber stocks the ultimate rubber displays superior resistance to water and aqueous chemicals, good tensile strength and abrasion resistance and, except for stocks filled with carbon black, exhibit low dielectric loss.

The best known of the active or reinforcing fillers for silicone rubber are silicas. Manufacture and natural silicas exhibiting high surface area per unit volume have been employed as reinforcing fillers (see U.S. Patent No. 2,541,137 assigned to Dow Corning Corporation). Some naturally occurring silicas such as diatomaceous earths are reinforcing silicas but more commonly the reinforcing silica is manufactured. Such manufactured silicas include fume silica and silica aerogels. Other reinforcing fillers for silicone rubber stocks include carbon blacks, finely divided gamma aluminum oxide with an average particle size of less than 100 microns and certain metal oxides such as titanium oxide.

The advantages achieved through the use of active fillers are well known in the art. Increased tensile strength and general upgrading of the ultimate elastomer are a direct result of the reinforcing effect of the active fillers. However, the use of reinforcing fillers introduces to the silicone rubber stocks the problem of crepe-aging. The crepe-aging effect is apparently a result of spontaneous interaction between polymer and filler resulting in cross-linking and tying up the molecules of the polymer to form a rigid mass.

A crepe-aged silicone rubber stock is difficult to remove from the container, difficult to handle and requires extensive milling to permit further forming and molding of the silicone rubber stock. The milling time or processing time for a crepe-hardened stock may be 30 minutes or so for a stock containing 30 percent less of filler, based on the polymer weight but it may be as much as several hours for stocks containing higher proportions of filler.

Furthermore, the use of active silica fillers results in reaction between polymer and filler during heat aging and this results in a sharp reduction in the elongation properties of the elastomeric product.

It is the primary object of this invention to introduce a silicone rubber stock based on siloxane polymer and reinforcing or active filler, free of the crepe-aging characteristics. An improved stock vulcanizable to superior elastomeric products is another object of this method. Other objects and advantages of this invention are detailed in or will be apparent from the disclosure and claims which follow.

This invention is a method of preparing silicone rubber stocks consisting essentially of mixing the siloxane polymer, reinforcing silica, vulcanizing agents and any other desired additives and milling the mixture at a temperature in the range of 60° C. to 200° C.

From the literature of the art it is accepted that heat hardenable silicone rubber stocks containing the vulcanizing agents, such as organic peroxides, will harden and become useless if exposed to temperatures above 50° C. Thus it is totally unexpected and exceedingly surprising that milling or kneading the silicone rubber stock containing the vulcanizing agent will result in a stock free of crepe-aging which will produce a superior elastomer when subsequently vulcanized. It is to be emphasized that the benefits of this invention are not realized when the silicone rubber stock is milled or kneaded at an elevated temperature in the absence of the vulcanizing agents.

The siloxane polymers used in the method of this invention are polymers conventionally used in silicone rubber stocks. Operative polymers have the general unit formula $$R_nSiO_{\frac{4-n}{2}}$$

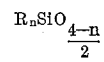

wherein each R is a monovalent hydrocarbon radical or halogenated monovalent hydrocarbon radical and $n$ has an average value of 1.95 to 2.01. Diorganosiloxane units predominate in such polymers and usually constitute 95 molar percent or more of the units present. However, limited amounts of monoorganosiloxane units and triorganosiloxane units can be present so long as the average organic substituent to silicon ratio remains within the prescribed limits. The organic substituents in the polymers can be alkyl radicals such as methyl, ethyl, propyl and octadecyl; aryl radicals such as phenyl, diphenyl and anthracyl; alkaryl radicals such as tolyl, xylyl and methylnaphthyl; aralkyl radicals such as benzyl and phenylethyl; cycloaliphatic radicals such as cyclopropyl, cyclobutyl and cyclohexyl and alkenyl radicals such as vinyl, allyl and octadecenyl as well as halogenated derivatives of the foregoing listed radicals including perchloromethyl, chlorofluoroethyl, bromomethyl, chlorophenyl, iodoanthracyl, fluorotolyl, bromobenzyl, perchlorocyclobutyl, fluorodichlorovinyl, trifluoropropyl and so forth. All of the organic substituents in the polymer can be the same or they can be different. It is preferred that at least 50 percent of the substituents be methyl radicals. Mixtures of polymers as well as copolymers can be employed. The operative polymers vary from fluids of viscosity as low as 1,000 cs. at 25° C. to gums having viscosities in the range of millions of cs. at 25° C. but remaining soluble in organic solvents.

The fillers employed herein are reinforcing fillers described above. The active silica fillers operative herein are fully described in U.S. Patent No. 2,541,137 noted supra. Fume silicas prepared pyrogenically in the gas phase are preferred. Also operative are metal oxides obtained pyrogenically, structure-retaining dehydrated silica hydrogels, diatomaceous earth, carbon blacks and other active fillers employed in silicone rubber stocks. The fillers are added over wide ranges of proportions including 20 parts to 200 parts filler per 100 parts by weight of polymer. The preferred range is 20 to 80 parts by weight active filler per 100 parts polymer.

The vulcanizing agents employed herein include benzoyl peroxide, chlorobenzoyl peroxide, 2,4-dichlorobenzoyl peroxide, t-butyl perbenzoate, dicumyl peroxide, di-t-butyl peroxide, tertiary butyl peracetate, zirconyl nitrate, sulfur, sulfur compounds such as thiuram sulfides, salts of dithiocarbamates, xanthates, xanthogen disulfides, phosphorous halide, alkyl silicates, antimony pentachloride, and other agents employed in heat vulcanizing silicone rubber stocks. The vulcanizing agents are employed in amounts of from .5 to 10 parts, preferably 1 to 5, by weight vulcanizing agent per 100 parts siloxane polymer.

Other additives such as compression set additives, oxidation inhibitors, pigments and plasticizers can be added to the silicone rubber stocks employed herein. Such additives are optional ingredients.

The method of the invention requires thorough mixing of the polymer, filler and vulcanizing agent together with any other additives employed. The mixture is then milled at a temperature of at least 60° C. but not over 200° C. until the filler and vulcanizing agent are uniformly distributed throughout the mixture. The resulting mixture can be stored at room temperature for extended periods of time without crepe-aging. After storage for weeks or months, the mixture can be softened by milling for an exceedingly short period of time generally equivalent to about $1/20$ of the time required with identical stocks which were not heat-milled in accordance with this invention. The heat stability of the ultimate rubber prepared from stocks produced according to this invention is superior to that of similar stocks not so prepared.

The following examples are offered to aid those skilled in the art to understand and practice this invention. All parts and percentages in the examples are based on weight unless otherwise specified and all viscosities are measured at 25° C. The examples do not limit the scope of the invention.

*Example 1*

A mixture was prepared of 100 g. of dimethyl-siloxane polymer having a molecular weight of about 500,000, 40 g. of fume silica having a surface area of 200 sq. meters per gram, and 2 g. of 2,4-dichlorobenzoyl peroxide. The mixture was divided into two equal portions designated stocks A and B. Stock A was milled and stored at room temperature without further processing for four weeks. Stock B was milled for 30 minutes at 120° C. and then stored at room temperature for four weeks. After four weeks storage the stocks were milled to produce molded sheets. Stock A required 20 minutes of milling to convert it to the plastic, moldable state. Stock B required one minute of milling to convert it to a plastic, moldable state. The stocks were sheeted and vulcanized at 120° C. and 5000 p.s.i. for five minutes. The sheets were heat aged for 12 hours at 150° C. followed by 12 hours at 200° C. The elongation at break for test samples cut from the heat-aged sheets was 260 percent for the samples from stock A and 550 percent for the samples from stock B. Thus stock B prepared according to this invention displayed greatly reduced crepe-aging as shown by processing time after storage and superior heat stability as shown by retention of physical properties after extended exposure to heat.

*Example 2*

A mixture of 50 g. of the dimethylsiloxane polymer of Example 1, and 20 g. fume silica was prepared. This mixture was milled at 120° C. for 30 minutes as was stock B in Example 1. After the heat-milling, 1 g. of 2,4-dichlorobenzoyl peroxide was cold-milled into the stock. This stock was identical in ingredients to stocks A and B and was designated stock C and stored at room temperature for four weeks. Stock C required 30 minutes of milling to convert it to a moldable material as compared to the 1-minute processing time for stock B. After heat aging for 12 hours at 150° C. followed by 12 hours at 200° C., the stock C samples had a breaking elongation of 250 percent as compared to 550 percent for stock B.

*Example 3*

When silicone rubber stocks comprising 20 to 80 parts fume silica, 1 to 10 parts benzoyl peroxide and 100 parts of any of the polymers listed below are heat-milled at 100° to 120° C. for 15 minutes to 3 hours, non-crepe-aging stocks vulcanizable to superior heat stable elastomers are obtained. Operable polymers include dimethylsiloxane polymers endblocked with hydroxyl, alkoxyl or methyl radicals having viscosity of 50,000 cs. to 1,000,000 cs.; copolymers of 80 to 95 mol percent phenylmethylsiloxane units; vinyldimethylsilyl endblocked dimethylpolysiloxanes; and copolymers of 90 mol percent dimethylsiloxane units, 5 mol percent phenylethylsiloxane units, 4 mol percent methylcyclohexylsiloxane units, 0.8 mol percent methylvinylsiloxane units and 0.2 mol percent vinylmethylphenylsiloxane units.

*Example 4*

Stocks exhibiting improved processing time and heat stability equivalent to that of stock B supra are obtained when the fume silica of stock B is replaced by titanium dioxide powder, carbon black, gamma aluminum oxide of average particle size below 100 microns, and silica aerogel.

*Example 5*

When the 2,4-dichlorobenzoyl peroxide of stock B in Example 1 is replaced by an equivalent amount of t-butyl perbenzoate, zirconyl nitrate, antimony pentachloride or t-butyl peracetate, the resulting stocks exhibit improved processing time and heat stability.

That which is claimed is:

1. A method of preparing silicone rubber stocks consisting essentially of preparing a mixture comprising 100 parts by weight of a siloxane polymer of the unit formula

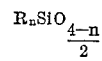

where each R is selected from the group consisting of monovalent hydrocarbon radicals and halogenated monovalent hydrocarbon radicals, and $n$ has an average value of from 1.95 to 2.01 said polymer having a viscosity at 25° C. of at least 50,000 cs., 20 to 80 parts by weight of a reinforcing filler selected from the group consisting of silica and carbon black, and .5 to 10 parts by weight of a heat-activated vulcanizing agent for silicon rubber, and thereafter milling the mixture at a temperature in the range 60° C. to 200° C. until a homogeneous mixture is obtained.

2. The method of claim 1 where R is methyl, the filler is fume silica and the vulcanizing agent is an organic peroxide.

3. The method of claim 1 where the siloxane polymer is a vinyldimethylsilyl endblocked dimethysiloxane, the filler is selected from the group consisting of fume silica and carbon black and the vulcanizing agent is selected from the group consisting of sulfur, thiuram sulfides, salts of dithiocarbamates, xanthates and xanthogen disulfides.

References Cited in the file of this patent

UNITED STATES PATENTS

| 2,460,795 | Warrick | Feb. 1, 1949 |
| 2,792,378 | Goodwin et al. | May 14, 1957 |
| 2,803,617 | Corrin | Aug. 20, 1957 |